(12) United States Patent
Sveum et al.

(10) Patent No.: US 8,443,474 B2
(45) Date of Patent: May 21, 2013

(54) DOCK LEVELERS WITH THERMALLY BALANCED TRACTION DECKS

(75) Inventors: Matthew Sveum, Wauwatosa, WI (US); Norbert Hahn, Franklin, WI (US); Paul D. Mathews, De Soto, MO (US); Robert Maxey, Millington, TN (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/278,944

(22) Filed: Oct. 21, 2011

(65) Prior Publication Data

US 2013/0097787 A1    Apr. 25, 2013

(51) Int. Cl.
*E01D 1/00*    (2006.01)

(52) U.S. Cl.
USPC .......................................... 14/69.5; 14/71.1

(58) Field of Classification Search
USPC ................................. 14/69.5, 71.1
See application file for complete search history.

(56) References Cited

U.S. PATENT DOCUMENTS

| 3,423,559 | A | | 1/1969 | Kuhns | |
| 4,826,534 | A | * | 5/1989 | Shubow | 106/18.11 |
| 6,502,268 | B2 | * | 1/2003 | Ashelin et al. | 14/71.1 |
| 2005/0172425 | A1 | * | 8/2005 | Hahn et al. | 14/71.1 |
| 2010/0017976 | A1 | * | 1/2010 | Metz et al. | 14/69.5 |
| 2010/0319143 | A1 | * | 12/2010 | Wessel | 14/71.1 |
| 2011/0010871 | A1 | * | 1/2011 | Metz et al. | 14/69.5 |

FOREIGN PATENT DOCUMENTS

DE    8910845    10/1989

* cited by examiner

*Primary Examiner* — Raymond W Addie
(74) *Attorney, Agent, or Firm* — Hanley, Flight & Zimmerman, LLC

(57) ABSTRACT

Example dock levelers installed at a vehicle loading dock include pivotal or otherwise vertically adjustable deck plates with special coatings on the deck's upper surface. In some examples, the coating improves traction and addresses various thermal issues, such as condensation and thermal strain between a polymeric coating and a steel deck plate. In some examples, when indoor and outdoor air create a temperature differential across opposite faces of the deck, the coating is designed such that a median temperature of the temperature differential occurs near an interface where the coating bonds to the steel plate's upper surface. In some examples, the coating includes particles of different sizes and colors embedded within and covered by a polymeric base material. As traffic abrades the coating, the different colored particles become exposed at different levels of wear, thereby providing a visual signal indicating when the coating needs to be touched up or replaced.

23 Claims, 5 Drawing Sheets

DOCK LEVELERS WITH THERMALLY BALANCED TRACTION DECKS

FIELD OF THE DISCLOSURE

This patent generally pertains to dock levelers and, more specifically, to dock leveler having thermally balanced traction decks.

BACKGROUND

Dock levelers are often used to compensate for a height difference that may exist between a loading dock platform and the bed of a truck parked at the dock. A dock leveler typically includes a ramp or deck plate that is hinged at its back edge to raise or lower its front edge to generally match the height of the truck bed. Often an extension plate or lip is pivotally coupled to the deck to bridge the gap between the deck's front edge and a back edge of the truck bed. The deck and lip provide a path for forklift trucks to travel between the loading dock platform and the truck bed, thus facilitating loading or unloading of the truck.

DETAILED DESCRIPTION

Figure 1:
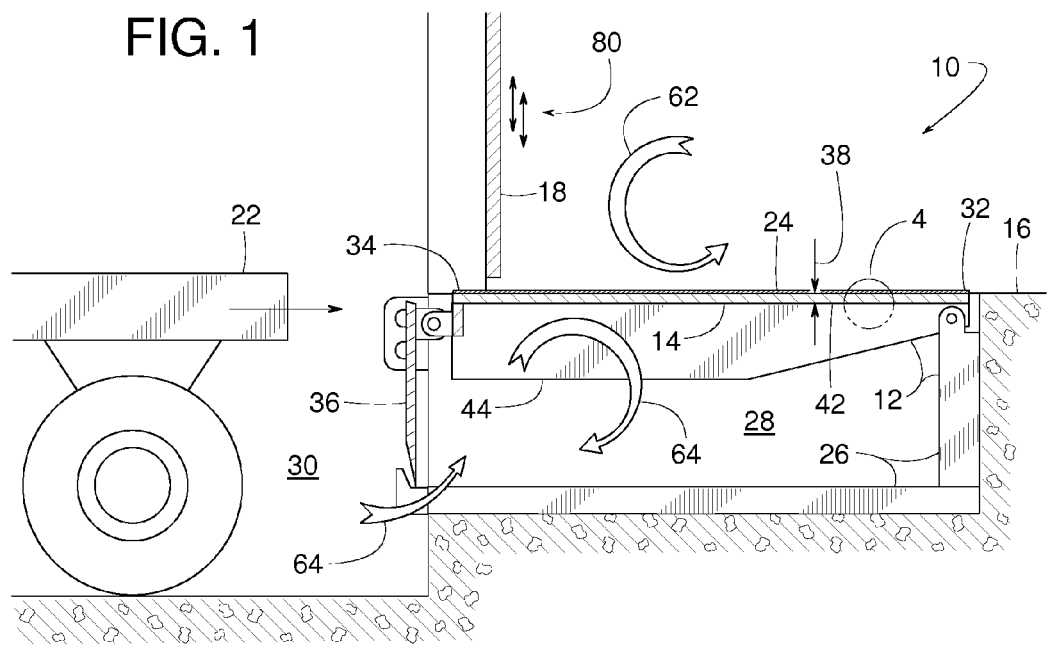
FIG. 1 is a cross-sectional side view of an example dock leveler system.
Figure 2:
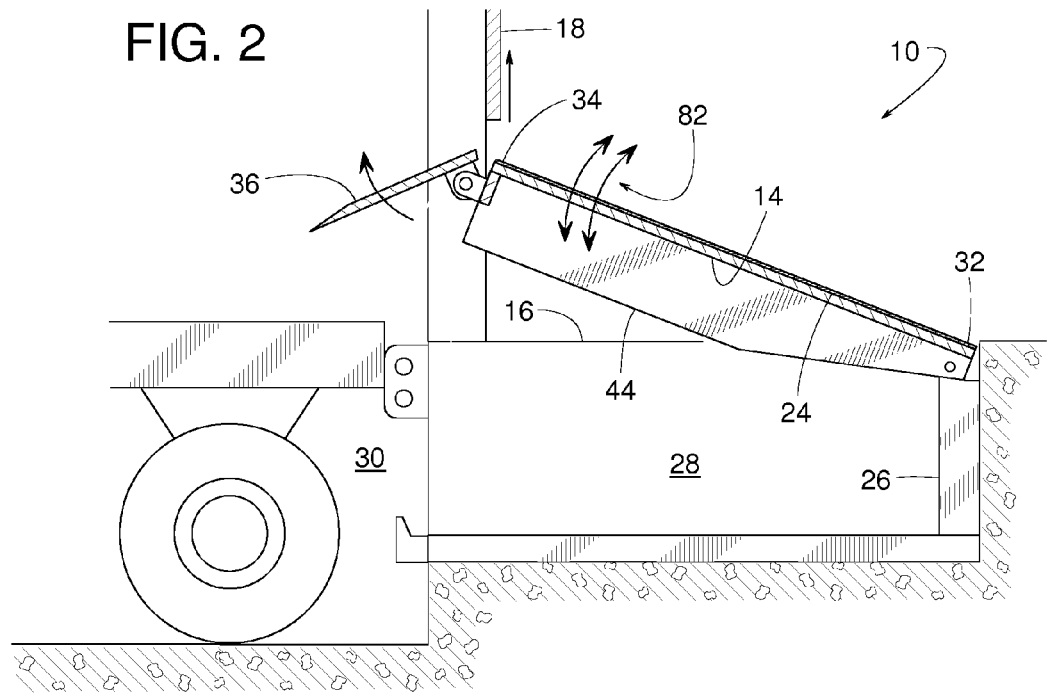
FIG. 2 is a cross-sectional side view of the dock leveler system of FIG. 1 but showing an example configuration of the dock leveler in a first position.
Figure 3:
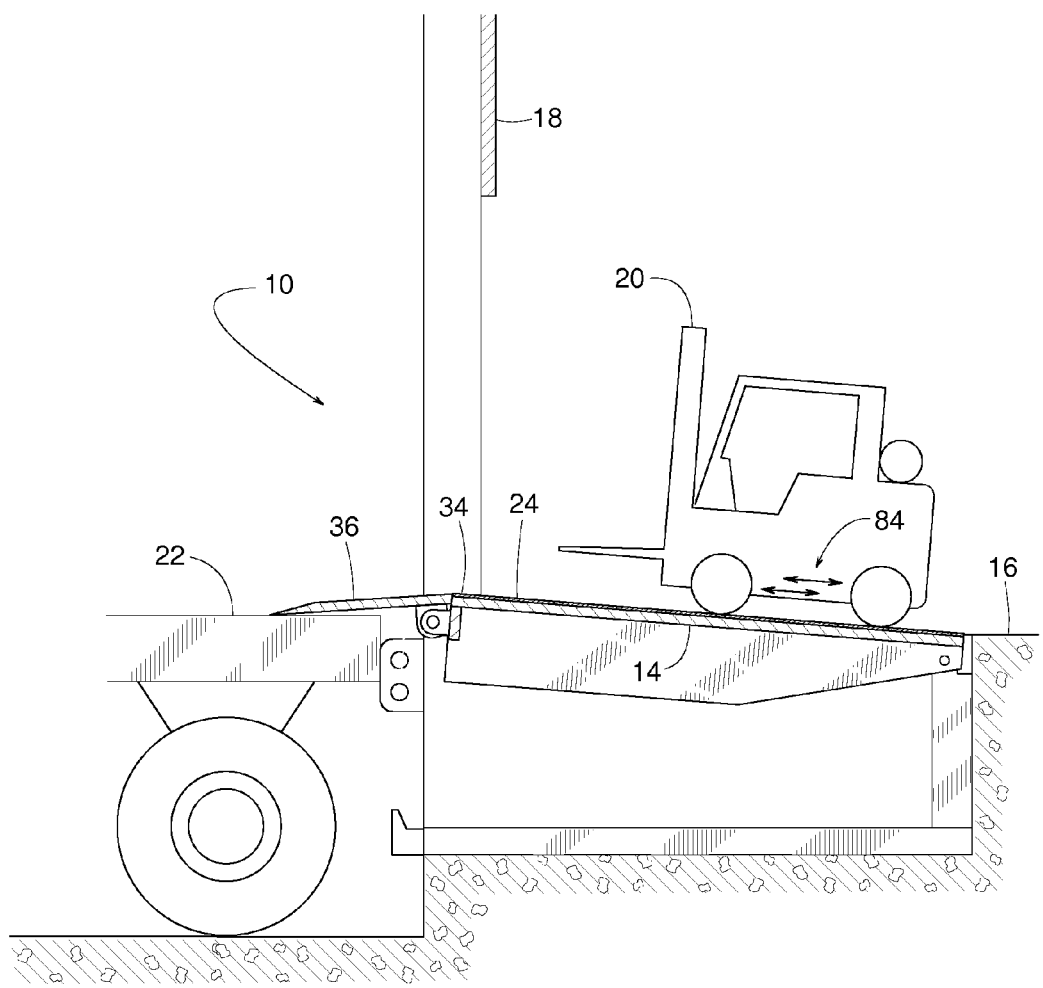
FIG. 3 is a cross-sectional side view of the dock leveler system of FIG. 1 but showing another example configuration of the dock leveler in a second position.

FIGS. 1-3 show an example dock leveler system 10 comprising a dock leveler 12 with a deck plate 14 that is vertically movable (e.g., movable via pivoting or translating) between a raised position (e.g., FIG. 2) and a lowered position (e.g., FIG. 1). FIG. 1 shows dock leveler 12 in its stored position with deck plate 14 being generally flush with and/or in generally the same plane as a loading dock platform 16, FIG. 2 shows a vertically moving door 18 opening and dock leveler 12 being deployed, and FIG. 3 shows dock leveler 12 deployed in an operative position. In the operative position, dock leveler 12 provides an adjustable height bridge across which a forklift 20 or other traffic can travel between a vehicle bed 22 and platform 16. In some examples, a special coating 24 on the deck's traffic surface improves traction, impedes corrosion, dampens traffic noise, dampens dock leveler operating noise, and/or serves as a temperature barrier to reduce condensation on deck plate 14.

Although coating 24 can be applied to a wide variety of dock levelers, in the illustrated example, dock leveler 12 comprises a frame 26 installed within a pit 28 of a loading dock 30. To compensate for a variable height difference that may exist between platform 16 and vehicle bed 22, a rear edge 32 of deck plate 14 is hinged to frame 26 so that pivoting deck plate 14 adjusts the elevation of the deck's front edge 34 to generally match the elevation of bed 22. In this example, an extension plate or lip 36 is pivotally coupled to deck 14 to bridge the gap between the deck's front edge 34 and the back edge of vehicle bed 22. When lip 36 is resting upon vehicle bed 22, as shown in FIG. 3, deck 14 and lip 36 provide a path for forklift 20 to travel between platform 16 and vehicle bed 22, thus facilitating loading or unloading of the vehicle's cargo.

Figure 4:
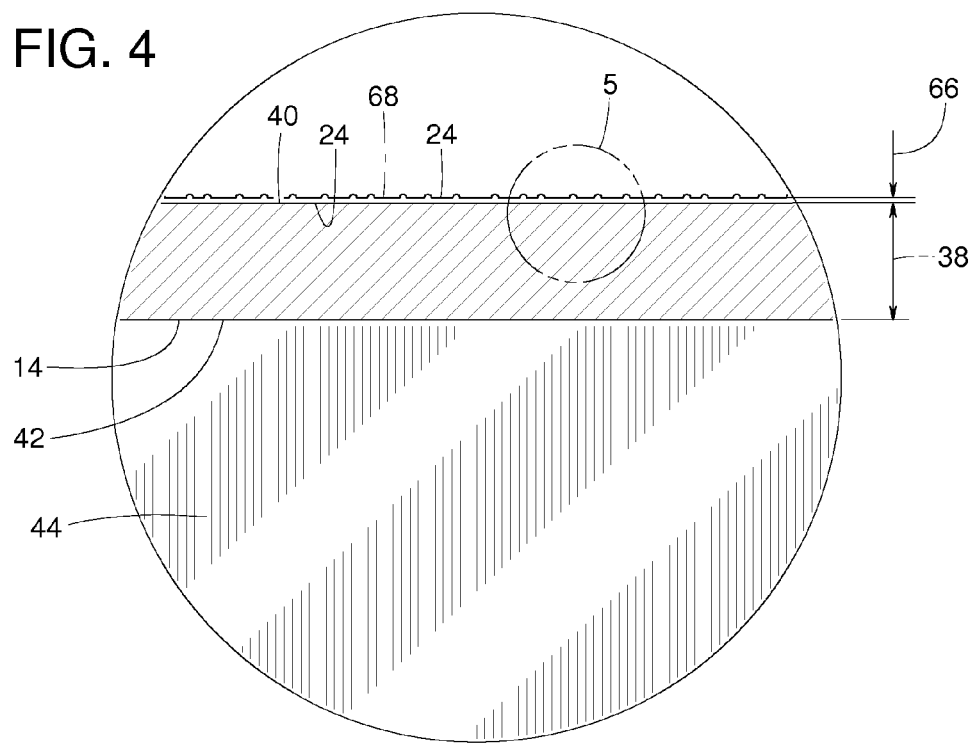
FIG. 4 is an enlarged cross-sectional view taken at circle 4 of FIG. 1.

In some examples, deck plate 14 is a generally smooth plate comprised of steel with a generally uniform plate thickness 38 (FIG. 1). Referring to FIG. 4, plate thickness 38 is defined by an average distance between an upper surface 40 and a lower surface 42 of plate 14. Example values or dimensions of thickness 38 include, but are not limited to, 3/16 inches, 1/4 inches, 5/16 inches, and 3/8 inches (nominal dimensions). In some examples, a plurality of stiffeners 44 (e.g., beams, joists, ribs, etc.) are attached to lower surface 42 to provide deck plate 14 with greater rigidity.

Figure 5:
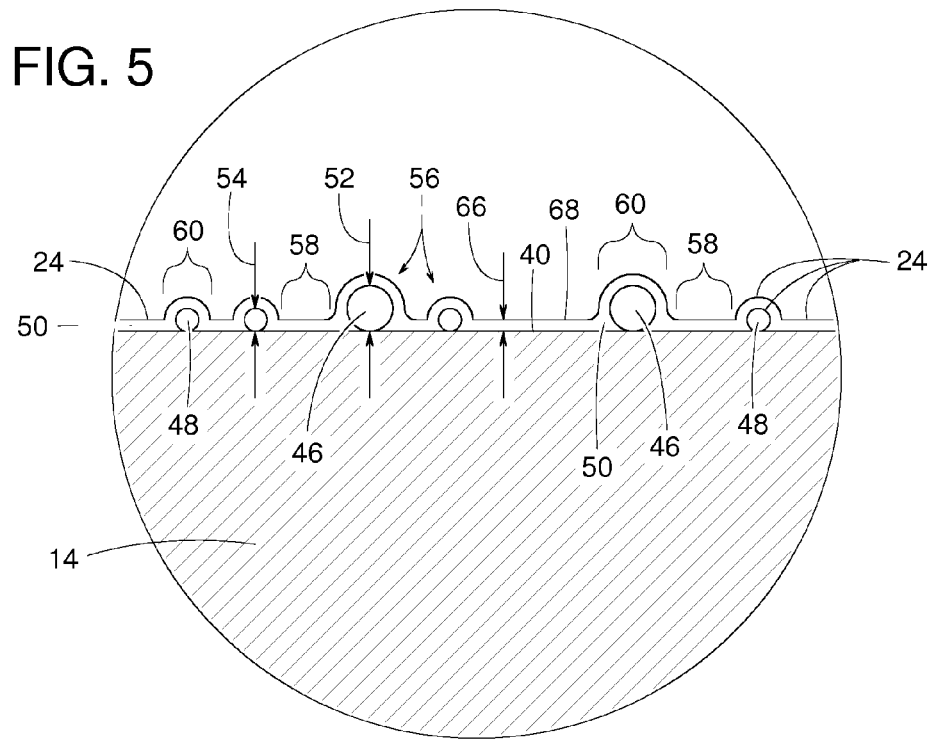
FIG. 5 is an enlarged cross-sectional view taken at circle 5 of FIG. 4.

Referring to FIG. 5, to address issues of traction (e.g., traction between forklift 20 and deck plate 14), corrosion, noise dampening, and/or thermal considerations (e.g., condensation and thermal expansion), some examples of coating 24 comprises a plurality larger particles 46 and a plurality of smaller particles 48 mixed, coupled to, covered by, or embedded within a polymeric base material 50. Material examples of larger particles 46 include, but are not limited to, polypropylene, sand, silica, glass, and/or metal and/or any combination thereof. Material examples of smaller particles 48 include, but are not limited to, polypropylene, sand, silica, glass, and/or metal and/or any combination thereof. Material examples of polymeric base material 50 include, but are not limited to, polyurethane, acrylic, enamel, and/or epoxy and/or any combination thereof. The terms, "larger" and "smaller" are being used solely in comparison to each other, i.e., larger particles 46 are relatively larger than smaller particles 48.

Although the actual shape and sizes of particles 46 and 48 may vary, in some examples of coating 24, most of larger particles 46 have an average large particle thickness 52 of between approximately 440-510 microns, and most of smaller particles 48 have an average small particle thickness 54 of between approximately 160-180 microns. The terms, "average large particle thickness" and "average small particle thickness" are defined as the cube root of an individual particle's volume (V) multiplied by 1.25 (i.e., $1.25 \times V^{1/3}$). Thus, in examples where the particle is spherical, the average large particle thickness 52 or average small particle thickness 54 is the sphere's diameter. In some examples, the particles are irregularly shaped and not spherical. However, the average large or small thickness of an irregularly shaped particle is still defined as the particle's volume multiplied by 1.25.

In some examples, prior to being dried, cured and/or otherwise set, coating 24 is comprised of, by weight, one part smaller particles 48, three parts larger particles 46, 36 parts polymeric base material 50, and 17 parts volatile liquid that evaporates as coating 14 sets. Examples of such volatile liquid include, but are not limited to, water, solvent, ketones and/or acetone and/or a combination thereof.

Figure 6:
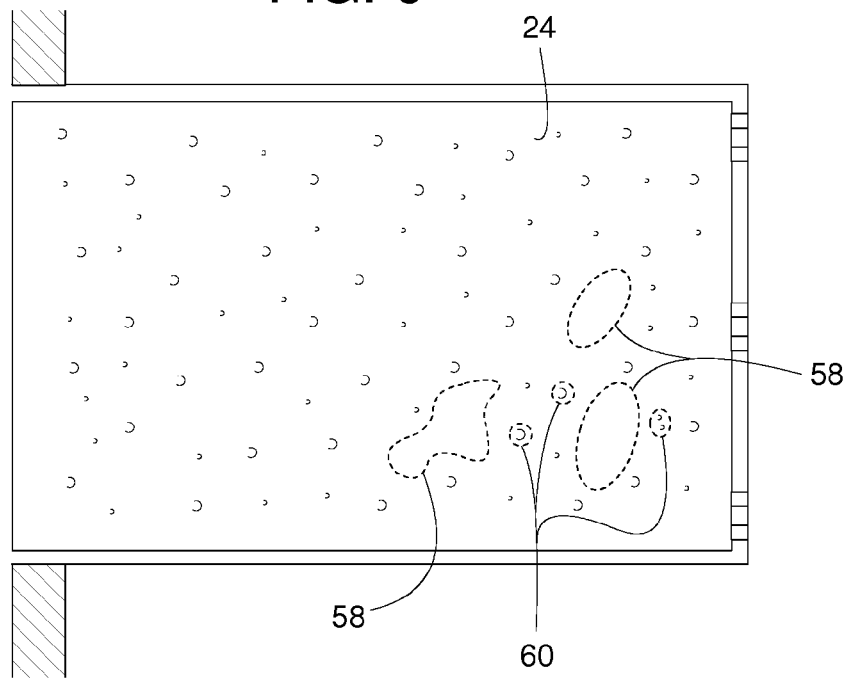
FIG. 6 is a top view of the example dock leveler shown in FIG. 1.

In the example formulation of one part smaller particles 48, three parts larger particles 46 and 36 parts polymeric base material 50, particles 46 and 48 are broadly distributed in polymeric base material 50 to create, as shown in FIGS. 5 and 6, a plurality of protrusions 56 intermingled with or otherwise distributed on deck 14 to provide a plurality of coating areas 58 void of particles (e.g., void of particles 46 and 48). The term, "broadly distributed" means that many of particles 46 and 48 are sufficiently spaced apart to create coating areas 58 void of particles 46 and 48. In some examples, as shown in FIG. 6, the plurality of protrusions 56 create a plurality of raised areas 60, and the plurality of coating areas 58 void of particles cover relatively more area on the deck's upper surface 40 than do the plurality of raised areas 60. The term, "void of particles" specifically means void of particles 46 and 48. Coating areas 58 void of particles may include other particles of inconsequential size.

In the illustrated example, most of particles 46 and 48 are completely embedded within and thus fully covered by polymeric base material 50. This helps ensure that traffic on deck plate 14 does not readily dislodge particles 46 and 48 from deck 14 and/or polymeric base material 50.

In addition to traffic, deck 14 and coating 24 can experience adverse thermal loads, temperature differentials and/or thermal shocks due to a number of factors. In some installations, as shown in FIG. 1, coating 24 is exposed to indoor air 62 at an indoor temperature (e.g., room temperature), and the deck's bottom side or lower surface 42 is exposed to outdoor air 64 at an outdoor temperature (e.g., different than the indoor temperature). Lower surface 42 being exposed to the outdoor temperature means that at least some outdoor air 64 reaches lower surface 42. Dock lever 12 being exposed to both indoor and outdoor air can create a temperature differential between coating 24 and the deck's lower surface 42. Depending on the positive or negative magnitude of the temperature differential and the dew points of the indoor and outdoor air, condensation might accumulate on either coating 24 or on the deck's lower surface 42. Condensation on coating 24 can reduce traction, and condensation on lower surface 42 can promote corrosion.

Additionally, repeatedly opening and closing door 18 in proximity with deck plate 14 and repeatedly raising and lowering deck 14 can create air currents that suddenly change the temperature of coating 24 and lower surface 42. Such temperature changes create thermal expansion in coating 24 and deck plate 14, which might urge coating 24 to separate from the deck's upper surface 40 if there is an imbalance in the relative thermal expansion between coating 24 and deck plate 14.

In some examples, to mitigate the unfavorable effects of various thermal adversities, a coating thickness 66 (thickness at coating areas 58), the thermal conductivity of base material 50, plate thickness 38, and the plate's thermal conductivity are such that for a given temperature differential between the indoor air temperature at the coating's topside 68 and the outdoor air temperature at the deck's lower surface 42, the median temperature of the temperature differential is focused near the deck's upper surface 40, which is at the transition between coating 24 and deck plate 14. This allows coating 24 and deck plate 14 to share more equally a given temperature differential, rather than coating 24 or deck plate 14 having to endure nearly all the thermal load. In examples where base material 50 has a lower thermal conductivity than deck plate 14, it may be beneficial to have the median temperature above the deck's upper surface 40. However, if the median temperature is excessively above the deck's upper surface 40, that may be the consequence of an excessively thick coating 24, and an excessively thick coating 24 might be too soft to withstand heavy traffic.

In some examples, to have the median temperature occur at or somewhat above deck surface 40, coating thickness 66 at area 58, the thermal conductivity of base material 50, plate thickness 38 and the plate's thermal conductivity are chosen such that a first thickness/conductivity ratio (defined as plate thickness 38 divided by the plate's thermal conductivity) is less than a second thickness/conductivity ratio (defined as coating thickness 66 at area 58 divided by the thermal conductivity of base material 50). Thus, the second thickness/conductivity ratio divided by the first thickness/conductivity ratio is, in some examples, greater than one. Although the units of measure for thickness and thermal conductivity are irrelevant per se, the units of measure, of course, are the same for meaningful comparison of two like features of thickness, thermal conductivity, and ratios thereof. For example, thickness comparisons may involve comparing inches to inches, or millimeters to millimeters, but not millimeters to centimeters.

In one example, deck plate 14 has a plate thickness 38 of about ¼ inches, a thermal conductivity of about 43 W/m-K, and a coefficient of thermal expansion of about $13 \times 10^6$ m/m-K; and coating 24 has a coating thickness 66 of 0.002 inches, with polymeric base material 50 having a thermal conductivity of 0.2 W/m-K and a coefficient of thermal expansion of about $70 \times 10^6$ m/m-K. This particular example provides deck plate 14 with a first thickness/conductivity ratio of 0.0058 (0.25/43=0.0058) and provides coating 24 with a second thickness/conductivity ratio of 0.0100 (0.002/0.2=0.0100), whereby the second thickness/conductivity ratio (0.0100) divided by the first thickness/conductivity ratio (0.0058) equals 1.7, which is greater than one.

Various examples of dock leveler system 10 include, plate thickness 38 ranging between about 3/16 to 3/8 inches, a thermal conductivity of deck plate 14 ranging between about 20 to 80 W/m-K, a coefficient of thermal expansion of deck plate 14 ranging between about $5 \times 10^6$ to $30 \times 10^6$ m/m-K, a coating thickness ranging between about 0.001 to 0.006 inches, base material 50 having a thermal conductivity ranging between about 0.1 to 0.4 W/m-K, a coefficient of thermal expansion of base material 50 ranging between about $30 \times 10^6$ to $140 \times 10^6$ m/m-K, and the second thickness/conductivity ratio of plate 14 divided by the first thickness/conductivity ratio of coating 24 ranging between approximately one and four. In examples where base material 50 has a coefficient of thermal expansion greater than that of deck plate 14, and the indoor temperature is warmer than the outdoor temperature (e.g., in colder climates), the relative coefficients of thermal expansion allows coating 24 to readily expand as the deck's upper surface 40 expands more than its lower surface 42.

Figure 7:
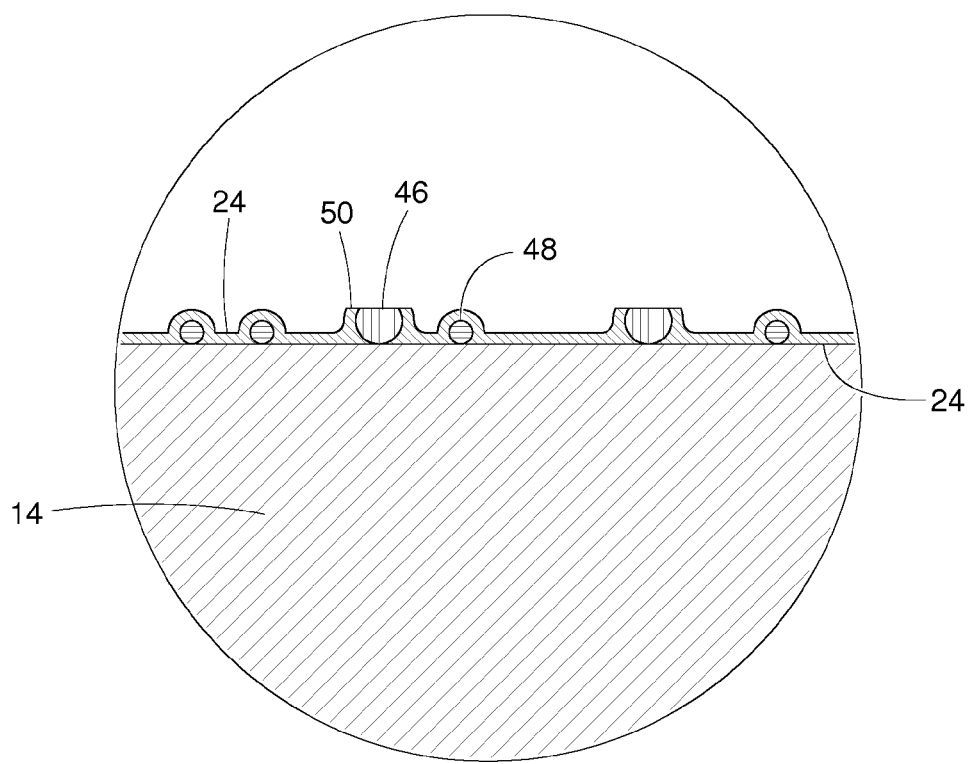
FIG. 7 is an enlarged cross-sectional view similar to FIG. 5 but showing a worn coating with various colors identified by hatching.

In some cases, after prolonged use of dock leveler system 10, it can be beneficial to identify one or more stages of coating wear caused by, for example, forklift 20 repeatedly traveling over coated deck plate 14. To this end, in some examples, polymeric base material 50 is of a different color than that of particles 46 and/or 48 so that coating 24 provides color changes as coating 24 wears down, as shown in FIG. 7. In some examples, for instance, base material 50 is green, larger particles 46 are red and smaller particles 48 are blue. In this particular example, coating 24 initially is green but begins turning red as larger particles 46 are exposed due to abrasion or wear of green base material 50 that had been covering the red larger particles 46. In this example, further abrasion or wear will exposes the smaller blue particles 48, so coating 24 will begin turning blue as coating 26 wears and exposes the smaller particles 48.

The timing or degree of color changes, in some examples, is dependent on the relative sizes of the larger and smaller particles. To provide an appreciable time span between the first exposure of red particles and subsequent exposure of blue particles, in some examples, the average large particle volume of larger particles 46 is more than ten times greater than the average small particle volume of smaller particles 48. Consequently, in some examples, the color changes indicate various degrees of coating wear and serve as signals that coating 24 may need to be reapplied or touched up.

Figure 8:
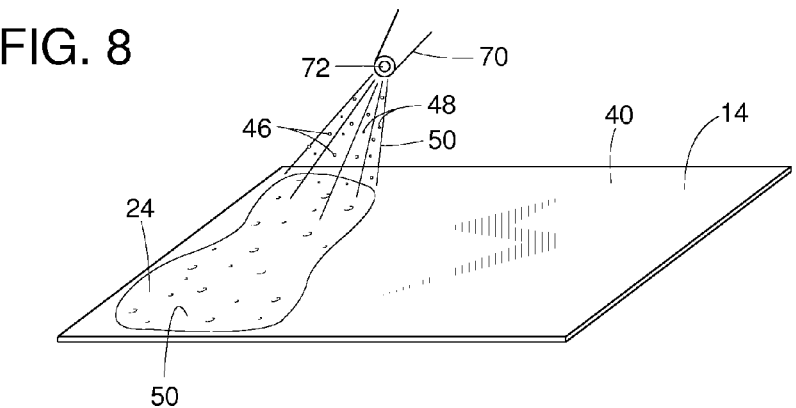
FIG. 8 is a perspective view showing an example coating being sprayed onto an example deck plate.
Figure 9:
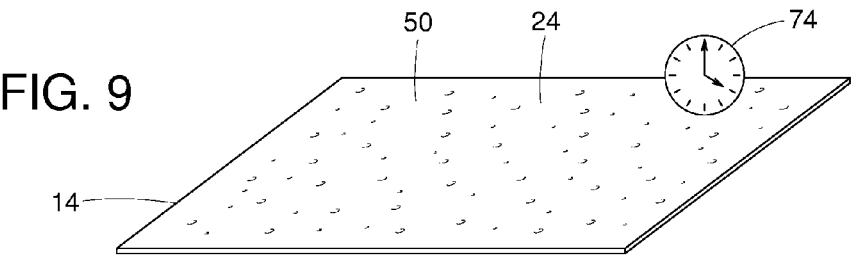
FIG. 9 is a perspective view showing the coating of FIG. 8 drying, curing or otherwise setting over time.
Figure 10:
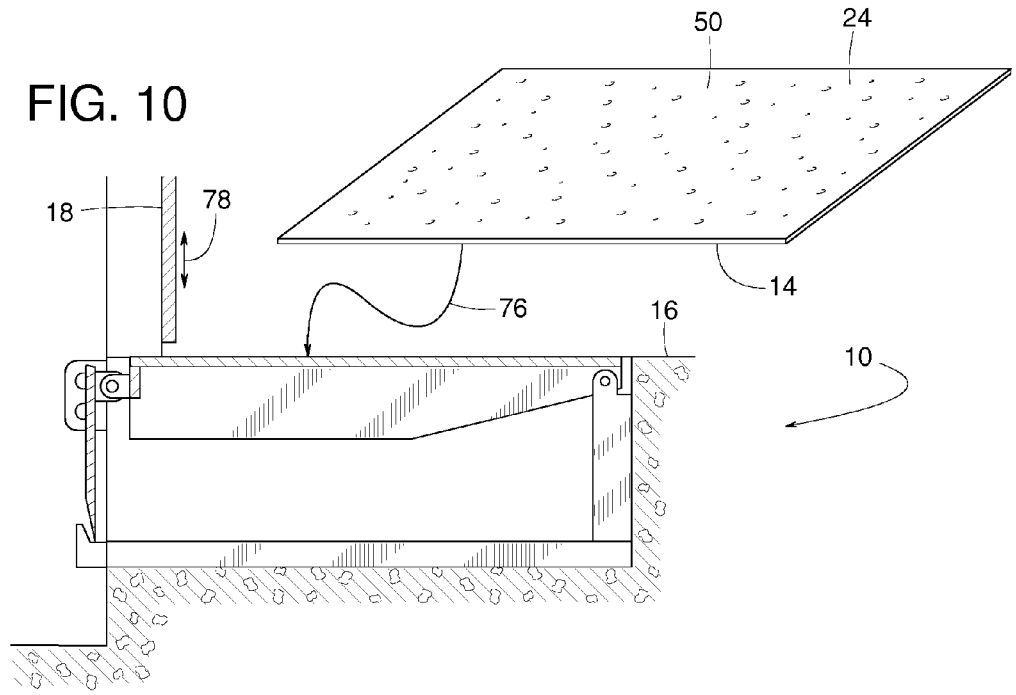
FIG. 10 is a perspective view showing installation of an example coated deck plate to a dock leveler.

FIGS. 8-10 show various methods associated with dock leveler system 10. FIG. 8 shows a spray nozzle 70 being used for spraying simultaneously base material 50 and particles 46 and 48 onto upper surface 40 of deck plate 14. To reduce the chance of one or two particles plugging an orifice 72 of nozzle 70, orifice 72 has an open cross-sectional orifice area that is more than two times greater than a maximum cross-sectional area of an average sized particle of the plurality of larger particles 46. In some examples, the orifice area is round with a diameter of 2.5 millimeters (about 0.1 inches) to spray a larger particle 46 having an approximate diameter of 0.02 inches. FIG. 8 with further reference to FIGS. 5 and 6 illustrate distributing particles and 46 and 48 within base material 50 to create the plurality of protrusions 56 intermingled with and/or distributed relative to the plurality of coating areas 58 void of particles 46 and 48. FIGS. 9 and 10 with further reference to FIGS. 5 and 6 illustrate the polymeric base material 50 completely covering most of particles 46 and 48. Clock 74 in FIG. 9 schematically illustrates allowing polymeric base material 50 to set, thereby creating coating 24 on the deck's upper surface 40. Arrow 76 in FIG. 10 illustrates installing deck plate 14 in proximity with vertically movable door 18 at loading dock platform 16. Arrow 78 in FIG. 10 and arrows 80 in FIG. 1 illustrate repeatedly opening and closing door 18. Arrows 82 in FIG. 2 illustrate repeatedly lifting and lowering deck plate 14 relative to loading dock platform 16. In FIG. 1, arrows representing indoor air 62 and outdoor air 64 illustrate simultaneously exposing coating 24 to a first temperature and exposing lower surface 42 of deck plate 14 to a second temperature, thereby subjecting deck plate 14 and coating 24 to a temperature differential. Arrows 84 in FIG. 3 with further reference to FIGS. 5 and 7 illustrate abrading coating 24 by repeatedly traveling over deck plate 14 and coating 24 changing color as a consequence of the abrading and exposing at least some of the plurality of larger particles 46.

It should be noted that references to "thickness" means an average thickness. Values of thermal conductivity for given materials are with reference to the materials being at 25 degrees Celsius. Values of coefficient of thermal expansion for given materials are with reference to the materials being at 21 degrees Celsius.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler system having a topside exposed to an indoor temperature and a bottom side exposed to an outdoor temperature, the dock leveler system comprising:
    a deck plate comprised of steel, the deck plate being movable selectively between a raised position and a lowered position, the deck plate having an upper surface and a lower surface that define a plate thickness therebetween, the lower surface being exposed to the outdoor temperature, the deck plate having a first thermal conductivity, the deck plate having a first thickness/conductivity ratio defined as the plate thickness divided by the first thermal conductivity; and
    a coating on the upper surface of the deck plate, the coating being exposed to the indoor temperature, the coating comprising:
    a) a polymeric base material;
    b) a plurality of larger particles; and
    c) a plurality of smaller particles smaller than the plurality of larger particles, the plurality of smaller particles and the plurality of larger particles being broadly distributed in the polymeric base material to create a plurality of protrusions intermingled with a plurality of coating areas void of particles, the coating having a coating thickness at the coating areas void of particles, the polymeric base material having a second thermal conductivity, the coating having a second thickness/conductivity ratio defined as the coating thickness divided by the second thermal conductivity, the second thickness/conductivity ratio divided by the first thickness/conductivity ratio being greater than one.

2. The dock leveler system of claim 1, wherein the second thickness/conductivity ratio divided by the first thickness/conductivity ratio is between approximately one and four.

3. The dock leveler system of claim 1, wherein most of the plurality of small particles are completely embedded within and thus fully covered by the polymeric base material.

4. The dock leveler system of claim 3, wherein the plurality of larger particles have an average large particle thickness, the plurality of smaller particles have an average small particle thickness, and both the average large particle thickness and the average small particle thickness are appreciably greater than the coating thickness.

5. The dock leveler system of claim 4, wherein the average large particle thickness is more than four times greater than the coating thickness.

6. The dock leveler system of claim 1, wherein most of the plurality of larger particles are completely embedded within and thus fully covered by the polymeric base material.

7. The dock leveler system of claim 1, wherein the polymeric base material has a coefficient of thermal expansion greater than that of the deck plate.

8. The dock leveler system of claim 1, wherein the polymeric base material has a coefficient of thermal expansion that is at least four times greater than that of the deck plate.

9. The dock lever system of claim 1, wherein the plurality of larger particles have an average large particle volume, the plurality of smaller particles have an average small particle volume, and the average large particle volume is more than ten times greater than the average small particle volume.

10. The dock leveler system of claim 1, wherein the plurality of larger particles are distinguishable from the plurality of smaller particles by way of color.

11. The dock leveler system of claim 1, wherein at least one of the plurality of larger particles and the plurality of smaller particles are distinguishable from the polymeric base material by way of color.

12. The dock leveler system of claim 1, further comprising a door disposed in proximity with the deck plate.

13. The dock leveler system of claim 1, wherein the plurality of protrusions create a plurality of raised areas, and the plurality of coating areas void of particles cover more area on the upper surface of the deck plate than do the plurality of raised areas.

14. A dock leveler system having a topside exposed to an indoor temperature and a bottom side exposed to an outdoor temperature, the dock leveler system comprising:
- a door having a lower edge vertically movable between an open position and a closed position, the door in the closed position having an interior face exposed to the indoor temperature and an exterior face exposed to the outdoor temperature;
- a deck plate comprised of steel and being disposed in proximity with the lower edge of the door when the lower edge is in the closed position, the deck plate being movable selectively between a raised position and a lowered position, the deck plate having an upper surface and a lower surface that define a plate thickness therebetween, the lower surface being exposed to the outdoor temperature, the deck plate having a first thermal conductivity, the deck plate having a first thickness/conductivity ratio defined as the plate thickness divided by the first thermal conductivity; and
- a coating on the upper surface of the deck plate, the coating being exposed to the indoor temperature, the coating comprising a polymeric base material and a plurality of particles, the plurality of particles being broadly distributed in the polymeric base material to create a plurality of protrusions intermingled with a plurality of coating areas void of particles, the coating having a coating thickness at the coating areas void of particles, the polymeric base material having a second thermal conductivity, the coating having a second thickness/conductivity ratio defined as the coating thickness divided by the second thermal conductivity, the second thickness/conductivity ratio divided by the first thickness/conductivity ratio being approximately greater than one and less than four, most of the plurality of particles being completely embedded within and fully covered by the polymeric base material, the plurality of particles having an average particle thickness that is more than approximately four times greater than the coating thickness, the polymeric base material having a coefficient of thermal expansion that is greater than a coefficient of thermal expansion of the deck plate.

15. The dock leveler system of claim 14, wherein the plurality of protrusions create a plurality of raised areas, and the plurality of coating areas void of particles cover more area on the upper surface of the deck plate than do the plurality of raised areas.

16. The dock leveler system of claim 14, wherein the coefficient of thermal expansion of the polymeric base material is at least four times greater than that of the deck plate.

17. The dock leveler system of claim 14, wherein the plurality of particles are distinguishable from the polymeric base material by way of color.

18. A dock leveler method, comprising:
- spraying simultaneously a polymeric base material, a plurality of larger particles and a plurality of smaller particles onto an upper surface of a deck plate comprised of steel, the polymeric base material having a coefficient of thermal expansion greater than a coefficient of thermal expansion of the deck plate;
- the polymeric base material completely covering most of the plurality of larger particles and covering most of the plurality of smaller particles;
- allowing the polymeric base material to set, thereby creating a coating on the upper surface of the deck plate;
- installing the deck plate in proximity with a vertically movable door at a loading dock platform;
- repeatedly opening and closing the door;
- repeatedly lifting and lowering the deck plate relative to the loading dock platform; and
- simultaneously exposing the coating to a first temperature and exposing a lower surface of the deck plate to a second temperature, thereby subjecting the deck plate and the coating to a temperature differential.

19. The dock leveler method of claim 18, wherein the coating has an average overall coating thickness, the plurality of larger particles having an average large particle thickness, the plurality of smaller particles having an average small particle thickness, the average overall coating thickness being less than the average large particle thickness and less than the average small particle thickness.

20. The dock leveler method of claim 18, wherein spraying the polymeric base material, the plurality of larger particles and the plurality of smaller particles onto the upper surface of a deck plate comprises using a spray nozzle having an orifice area that is more than two times greater than a maximum cross-sectional area of an average sized particle of the plurality of larger particles.

21. The dock leveler method of claim 18, further comprising:
- abrading the coating by repeatedly traveling over the deck plate; and
- the coating changing color as a consequence of the abrading exposing at least some of the plurality of larger particles.

22. The dock leveler method of claim 18, wherein the upper surface and the lower surface of the deck plate defines a plate thickness therebetween, the deck plate having a first thermal conductivity, the deck plate having a first thickness/conductivity ratio defined as the plate thickness divided by the first thermal conductivity; and further comprising:
- distributing the plurality of smaller particles and the plurality of larger particles within the polymeric base material to create a plurality of protrusions intermingled with a plurality of coating areas void of particles, the coating having a coating thickness at the coating areas void of particles, the polymeric base material having a second thermal conductivity, the coating having a second thickness/conductivity ratio defined as the coating thickness divided by the second thermal conductivity, the second thickness/conductivity ratio being greater than the first thickness/conductivity ratio.

23. The dock leveler system of claim 22, wherein the plurality of protrusions create a plurality of raised areas, and the plurality of coating areas void of particles cover more area on the upper surface of the deck plate than do the plurality of raised areas.

* * * * *